United States Patent
Aguilar Ruelas et al.

(10) Patent No.: US 10,625,683 B2
(45) Date of Patent: Apr. 21, 2020

(54) PUSH HANGER HOOK

(71) Applicant: FORD GLOBAL TECHNOLOGIES, LLC, Dearborn, MI (US)

(72) Inventors: Eduardo Arturo Aguilar Ruelas, Mexico City (MX); Hector Alberto Mendoza Saldivar, Cuautitlan Izcalli (MX); Roberto Pena Bandala, Tlahuac (MX)

(73) Assignee: Ford Global Technologies, LLC, Dearborn, MI (US)

( * ) Notice: Subject to any disclaimer, the term of this patent is extended or adjusted under 35 U.S.C. 154(b) by 89 days.

(21) Appl. No.: 15/939,499

(22) Filed: Mar. 29, 2018

(65) Prior Publication Data

US 2019/0299869 A1    Oct. 3, 2019

(51) Int. Cl.
| | |
|---|---|
| *B60R 7/10* | (2006.01) |
| *B60R 11/02* | (2006.01) |
| *H01R 33/97* | (2006.01) |
| *B60R 11/00* | (2006.01) |
| *B60P 7/08* | (2006.01) |

(52) U.S. Cl.
CPC ............ *B60R 7/10* (2013.01); *B60R 11/0241* (2013.01); *H01R 33/97* (2013.01); *B60P 7/0807* (2013.01); *B60R 2011/0015* (2013.01); *B60R 2011/0022* (2013.01); *B60R 2011/0064* (2013.01); *B60R 2011/0082* (2013.01)

(58) Field of Classification Search
CPC ...... Y10T 24/4544; B60P 7/0807; B60R 7/10; B60R 11/0241; B60R 2011/0015; B60R 2011/0022; B60R 2011/0064; B60R 2011/0082; H01R 33/97

USPC ......... 410/106, 107, 109, 111, 112; 248/304, 248/307, 308, 224.7, 231.9, 220.21, 27.1, 248/499; 297/188.07, 188.03; 224/549, 224/543, 483, 548, 927, 925, 544, 567, 224/568; 119/790; 296/37.1
See application file for complete search history.

(56) References Cited

U.S. PATENT DOCUMENTS

| | | | | |
|---|---|---|---|---|
| 1,200,540 | A * | 10/1916 | Swedlund ............... | A44C 5/145 24/601.6 |
| 2,390,257 | A * | 12/1945 | Jahn ...................... | A47G 25/065 248/294.1 |
| 3,414,226 | A * | 12/1968 | Patnaude .................. | E04H 4/10 248/499 |
| 3,424,418 | A * | 1/1969 | Freedman ............. | A47G 25/065 248/304 |

(Continued)

FOREIGN PATENT DOCUMENTS

| | | |
|---|---|---|
| CN | 106043146 A | 10/2006 |
| EP | 1332920 A1 | 8/2003 |
| EP | 2305516 A1 | 4/2011 |

OTHER PUBLICATIONS

English Machine Translation of CN106043146A.

*Primary Examiner* — Ingrid M Weinhold
(74) *Attorney, Agent, or Firm* — David Coppiellie; King & Schickli, PLLC

(57) ABSTRACT

An apparatus, in the form of a push hanger hook, includes a housing, a hook fixed to the housing and a cover including a hook receiver. The cover is displaceable between a deployed position wherein the hook is received within the hook receiver and a retracted position wherein the cover is retracted into the housing and the hook is exposed from the hook receiver for access and use.

18 Claims, 18 Drawing Sheets

(56) References Cited

U.S. PATENT DOCUMENTS

| | | | | |
|---|---|---|---|---|
| 3,556,457 | A * | 1/1971 | Patnaude | F16B 45/02 248/499 |
| 3,694,866 | A * | 10/1972 | Maier | B60P 7/0807 24/115 J |
| 3,960,091 | A * | 6/1976 | Ehlert | B60P 7/0807 410/96 |
| 5,507,423 | A | 4/1996 | Fischer et al. | |
| 5,769,294 | A * | 6/1998 | Heinz | B60R 7/02 224/544 |
| 6,065,657 | A | 5/2000 | Fischer | |
| 6,213,533 | B1 | 4/2001 | Widulle et al. | |
| 6,464,437 | B1 * | 10/2002 | Elwell | B60P 7/0807 410/106 |
| 6,565,301 | B1 * | 5/2003 | Lin | B60P 7/0807 410/107 |
| 6,651,576 | B1 * | 11/2003 | Lo | B63B 21/045 114/218 |
| 6,663,067 | B2 | 12/2003 | Gordon | |
| 6,666,504 | B2 * | 12/2003 | Guanzon | B60P 7/0807 296/216.04 |
| 6,698,695 | B1 * | 3/2004 | Spoto | B60R 7/02 24/567 |
| 7,669,821 | B2 * | 3/2010 | Martin | B60R 7/043 224/313 |
| 8,540,198 | B2 * | 9/2013 | Keyvanloo | A47F 5/0823 248/220.21 |
| 8,613,578 | B2 * | 12/2013 | Hutchinson | A44B 13/0076 410/106 |
| 8,733,830 | B2 * | 5/2014 | Sanchez | B60N 2/838 297/188.03 |
| 9,193,294 | B1 * | 11/2015 | Egigian | B60P 7/0823 |
| 9,296,325 | B2 * | 3/2016 | Kim | B60N 3/14 |
| 9,561,755 | B2 * | 2/2017 | Huelke | B60R 7/10 |
| D790,456 | S * | 6/2017 | Aiello | D13/107 |
| 9,855,882 | B2 * | 1/2018 | Renke | B60P 7/0807 |
| 9,931,991 | B2 * | 4/2018 | Huelke | B60R 7/10 |
| D835,034 | S * | 12/2018 | Tuffy | D13/108 |
| 10,259,396 | B2 * | 4/2019 | Dyle | B60R 11/00 |
| 2001/0031187 | A1 * | 10/2001 | Goham | B60P 7/0807 410/106 |
| 2003/0039526 | A1 * | 2/2003 | Yuan | B60P 7/0807 410/107 |
| 2006/0061110 | A1 * | 3/2006 | Haba | E05B 77/02 292/300 |
| 2013/0067696 | A1 * | 3/2013 | Hutchinson | A44B 13/0076 24/265 CD |
| 2013/0221712 | A1 * | 8/2013 | Sanchez | B60N 2/838 297/188.03 |
| 2015/0343960 | A1 * | 12/2015 | Dyle | B60R 11/00 307/9.1 |
| 2016/0023611 | A1 * | 1/2016 | Huelke | B60R 7/10 224/486 |
| 2017/0320426 | A1 * | 11/2017 | Renke | B60P 7/0876 |
| 2018/0208121 | A1 * | 7/2018 | Mozurkewich | B60R 7/08 |
| 2019/0305571 | A1 * | 10/2019 | Tuffy | A47F 9/00 |

* cited by examiner

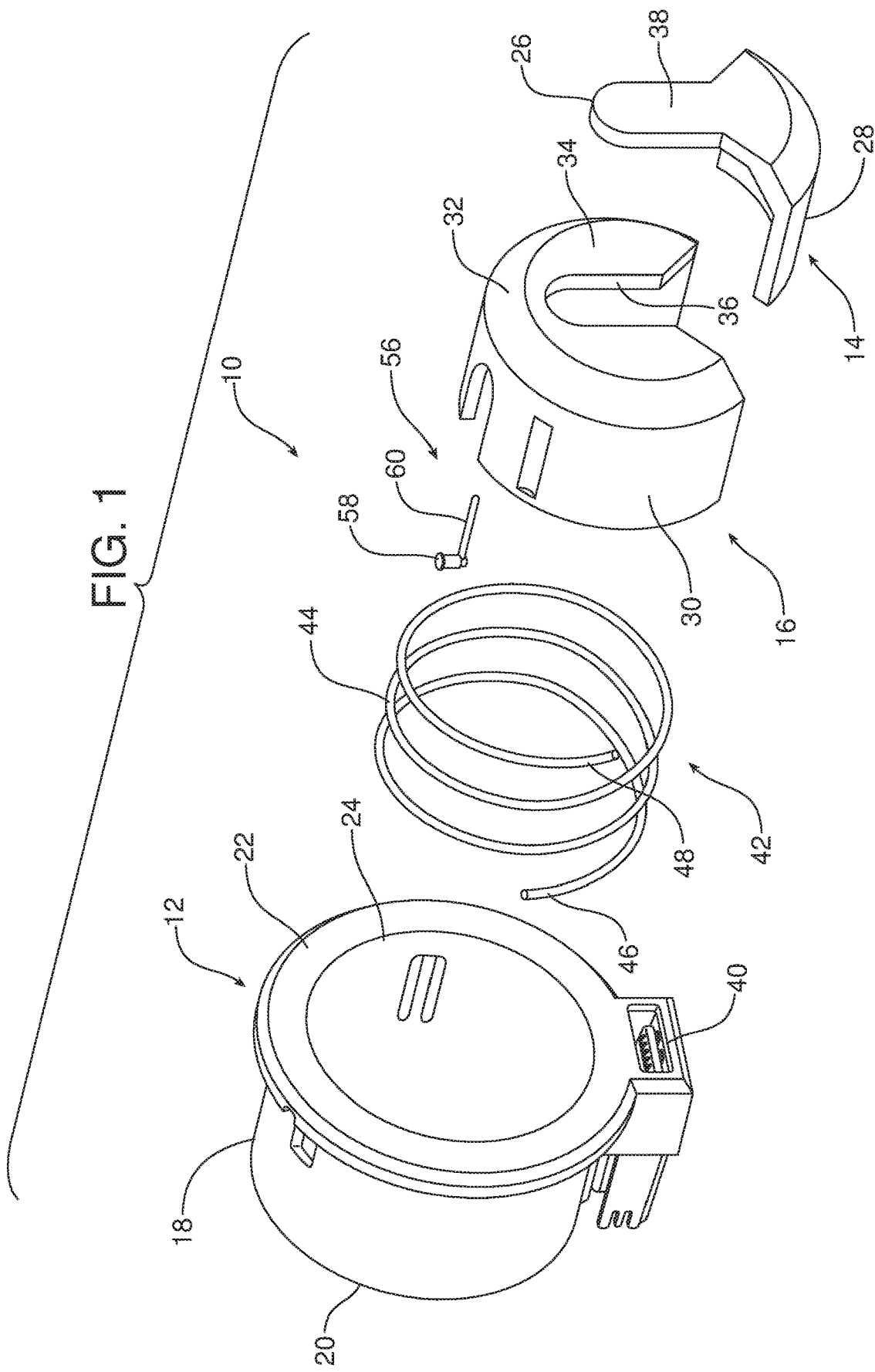

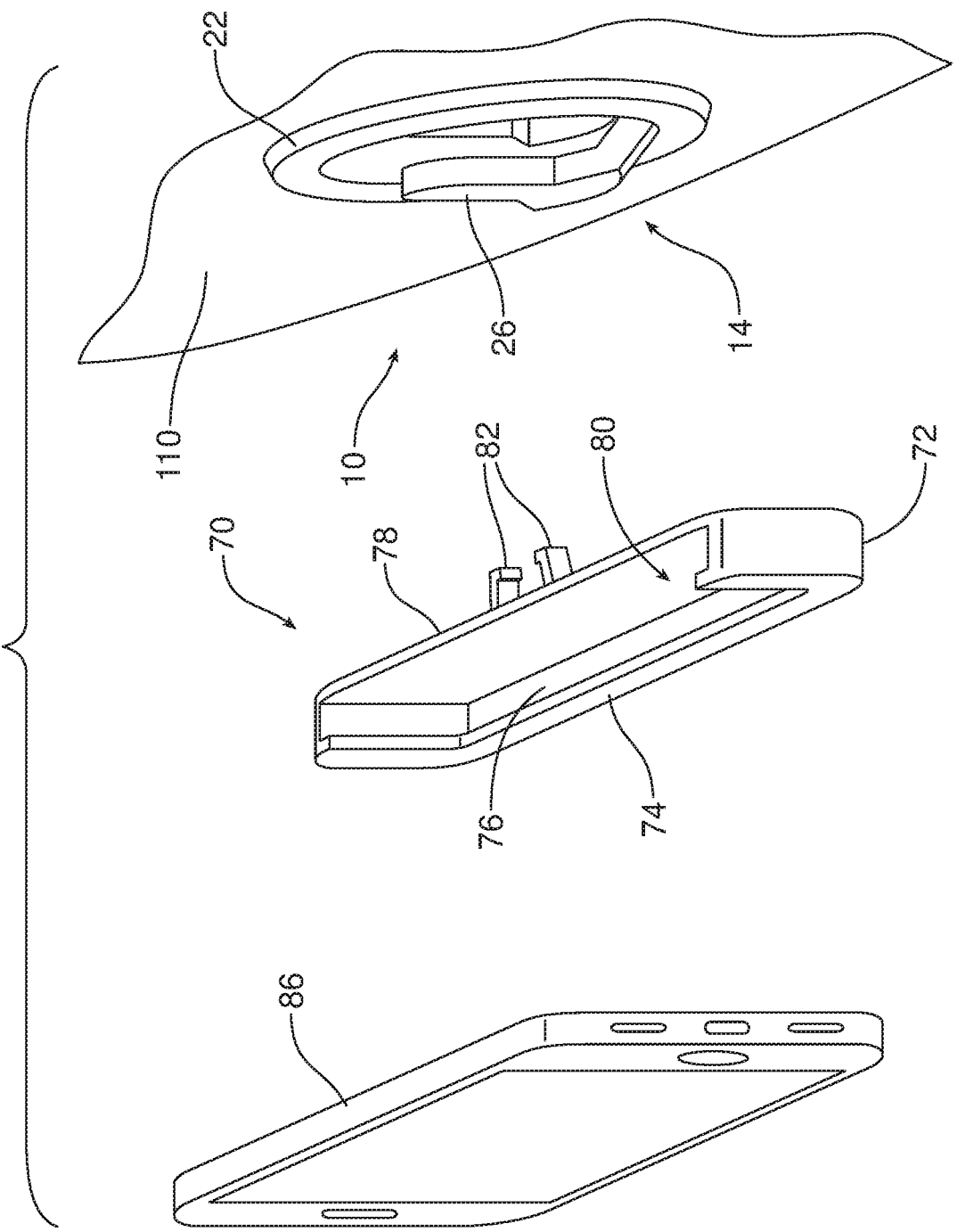

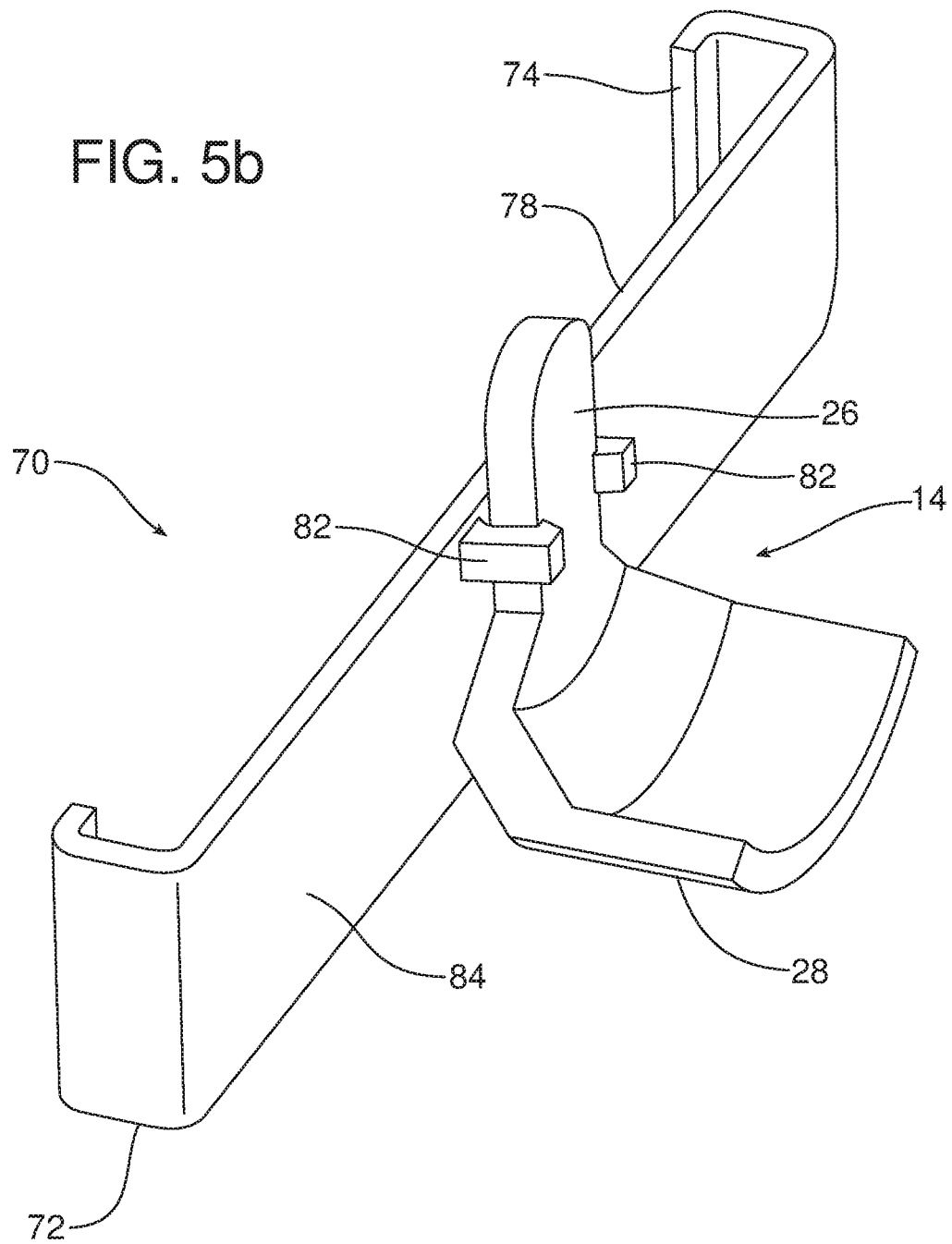

PUSH HANGER HOOK

TECHNICAL FIELD

This document relates generally to the motor vehicle equipment field and, more particularly, to an apparatus in the form of a push hanger hook that provides an inexpensive, convenient and efficient way to manage various items that may be transported in a motor vehicle.

BACKGROUND

Occupants of motor vehicles often transport various items such as clothing, bags and electronic devices such as smart phones and navigation devices. This document relates to a new and improved push hanger hook that is inexpensive to produce and may be installed as original equipment at a number of convenient locations within the interior of a motor vehicle. Such push hanger hooks provide occupants with convenient locations and adequate capacity to organize and manage the many various items that may be transported in a motor vehicle by those occupants. Advantageously, the push hanger hook is user friendly and easy to use, is endowed with a pleasing, aesthetic appearance, may be implemented at a low cost and is sufficiently versatile to meet the needs of a number of different applications.

SUMMARY

In accordance with the purposes and benefits described herein, a new and improved apparatus, in the form of a push hanger hook is provided. That apparatus comprises a housing, a hook fixed to the housing and a cover including a hook receiver. The cover is displaceable between a deployed position wherein the hook is received within the hook receiver in a manner that hides the hook in an aesthetically pleasing manner and a retracted position wherein the cover is retracted into the housing and the hook is exposed from the hook receiver for access and use.

The cover may include a frustoconical sidewall and an end wall. In such an embodiment the hook receiver may extend across the end wall and the frustoconical sidewall.

In one or more of the many possible embodiments of the apparatus, the hook has a projecting profile and the hook receiver matches that projecting profile. Further, the hook has a front face and the end wall is flush with the front face when the cover is in the deployed position. The apparatus may further include a USB port carried on the housing. In one particularly useful embodiment, the USB port is located below the hook.

The apparatus may further include an actuator in the housing to displace the cover between the deployed position and the retracted position. The actuator may include a spring biasing the cover in a first direction toward the hook. Further, the actuator may include a guide track carried on the housing. Still further, the actuator may include a pin follower carried on the cover. That pin follower engages in the guide track. Still further, the guide track may include a recessed guideway and a cam that engages the pin follower and guides the pin follower along the recessed guideway.

In at least one of the many possible embodiments of the apparatus, the housing may include a bezel and at least one retaining tab defining a slot. Further, the apparatus may include a trim panel having a margin defining a housing receiver. When the housing is mounted in the housing receiver, a portion of the margin is captured in the slot between the bezel and the at least one retaining tab.

In at least one of the many possible embodiments of the apparatus, the housing may also include at least one adjustment tab. The margin may include a plurality of adjustment tab receivers. The angular orientation of the housing and, therefore, the hook carried on the housing may be adjusted in the housing receiver by rotating the housing in the trim panel and engaging the at least one adjustment tab in different adjustment tab receivers radially arrayed around the housing receiver on the margin.

In the following description, there are shown and described several preferred embodiments of the apparatus. As it should be realized, the apparatus is capable of other, different embodiments and its several details are capable of modification in various, obvious aspects all without departing from the apparatus as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and together with the description serve to explain certain principles thereof.

FIG. 1 is a detailed exploded perspective view of the apparatus including the housing, the hook, the cover and the actuator.

FIGS. 5a-5d are a series of illustrations of an electronic device holder that is adapted: a) to receive and hold an electronic device; and b) to be secured to the hook of the apparatus illustrated in FIGS. 1, 2a and 2b.

FIG. 9a is a front perspective view of the alternative embodiment of the apparatus while FIG. 9b is a rear perspective view.

Reference will now be made in detail to the present preferred embodiments of the apparatus, examples of which are illustrated in the accompanying drawing figures.

DETAILED DESCRIPTION

Figure 2A:
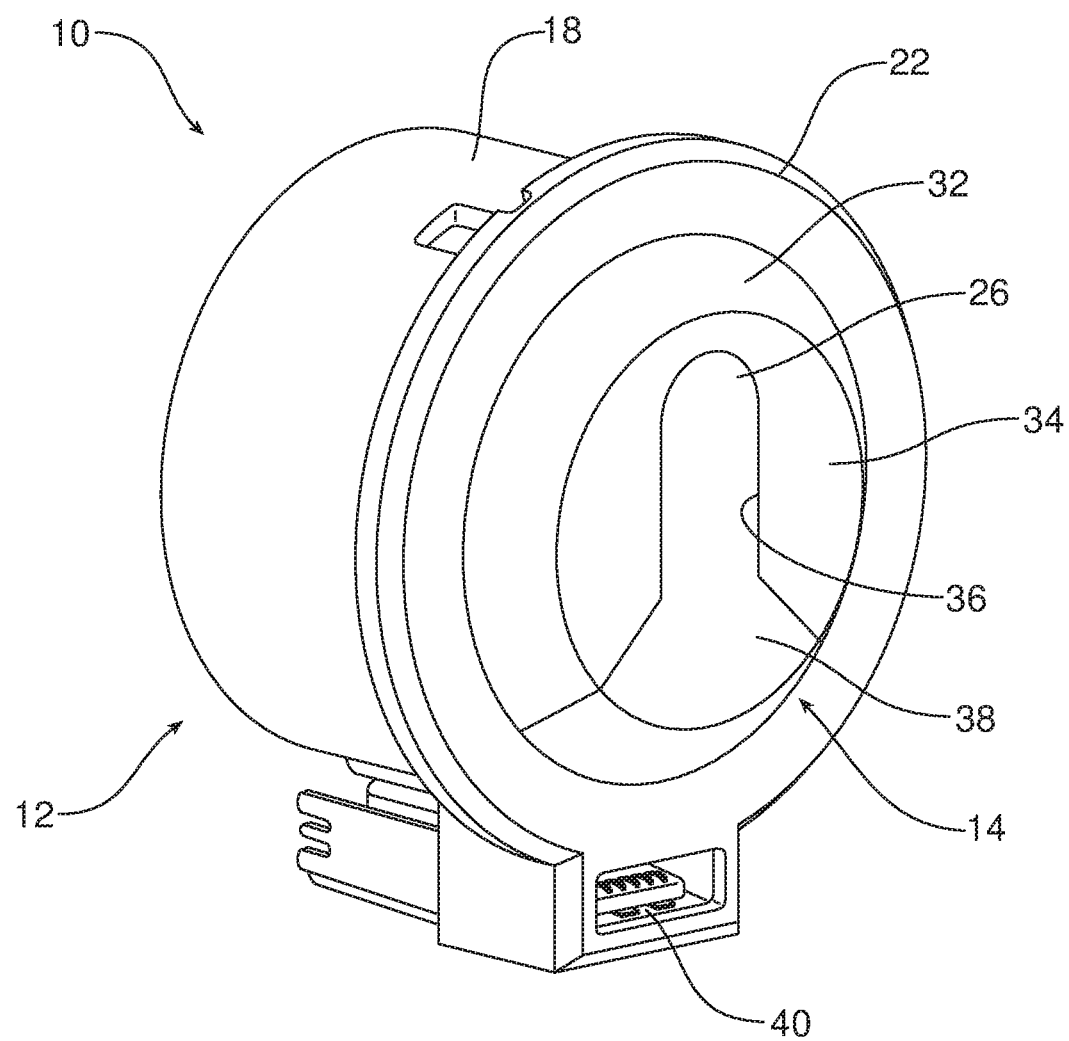
FIG. 2a is a perspective view of the assembled apparatus illustrated with the cover in the deployed position wherein the cover extends around the projecting profile of the hook.
Figure 2B:
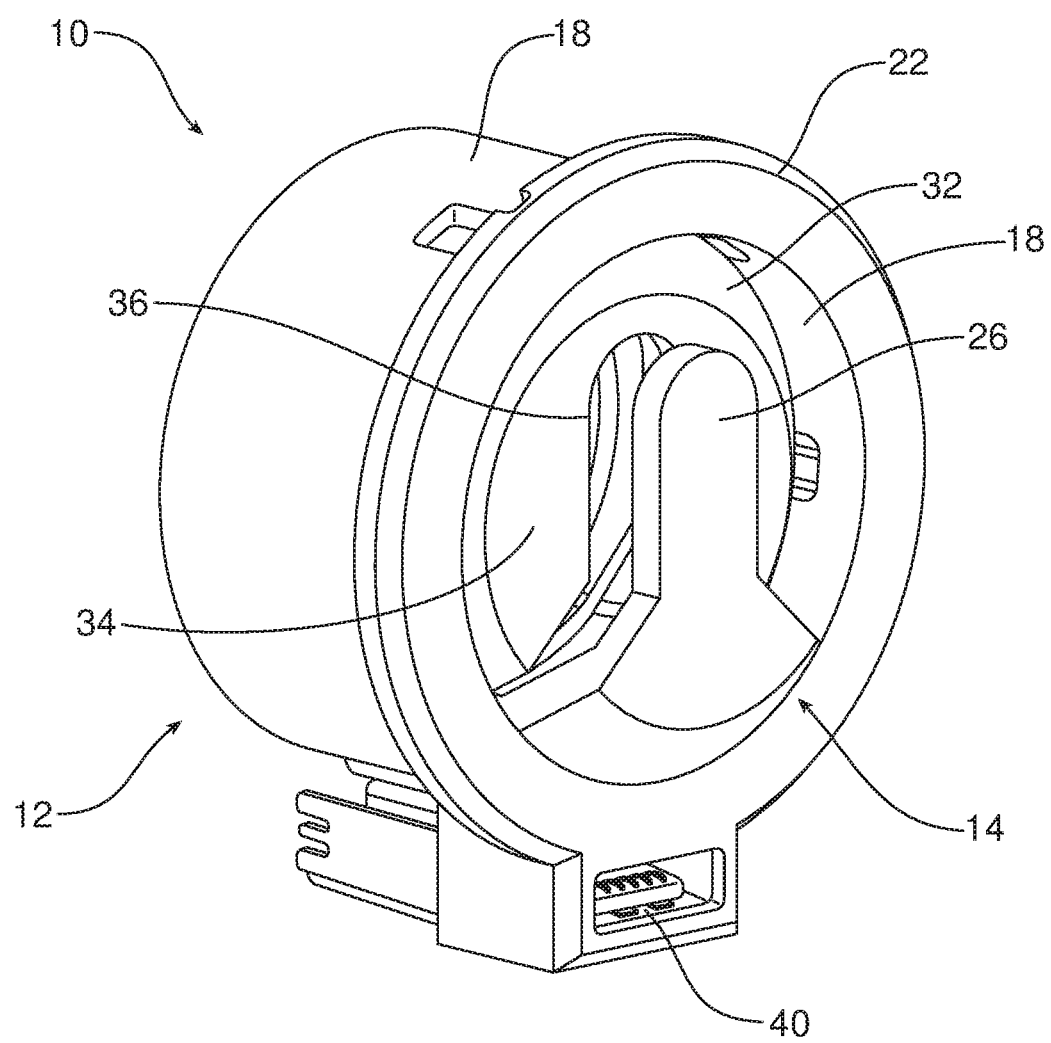
FIG. 2b is a view similar to FIG. 2a but illustrating the cover in the retracted position wherein the hook is exposed for use.

Reference is now made to FIGS. 1, 2a and 2b which illustrate the new and improved apparatus 10 which may also be known as a push hanger hook. As illustrated, the apparatus 10 includes a housing 12, a hook 14, that is fixed to the housing, and a cover 16. More specifically, the housing 12 includes a cylindrical sidewall 18 that is closed at one end by an end wall 20. A mounting flange or bezel 22 extends around the cylindrical sidewall 18 at the open end 24.

The hook 14 includes a hook feature 26 that depends from a base 28 that may be secured by adhesive or other means to the cylindrical sidewall 18 just inside the open end 24. The cover 16 includes three sections: a cylindrical sidewall 30, a frustoconical sidewall 32 and a front wall 34. The cover 16 also includes a hook receiver 36. The hook receiver 36 matches the projecting profile of the hook 14. In the illustrated embodiment, the hook receiver 36 extends across the front wall 34 and the frustoconical sidewall 32.

The cylindrical sidewall 30 of the cover 16 is sized and shaped to fit concentrically inside the cylindrical sidewall 18 of the housing 12 and slide freely therein so that the cover is displaceable between a deployed position (illustrated in FIG. 2a) wherein the hook 14 is received within the hook receiver 36 and a retracted position wherein the cover is retracted into the housing 12 and the hook is exposed from the hook receiver for access and use. In the deployed position illustrated in FIG. 2a, the front face 38 of the hook 14 and the front wall 34 of the cover 16 are flush so as to provide an aesthetically pleasing appearance and conceal the hook.

As illustrated in FIGS. 2a and 2b, the apparatus 10 may also include a USB port 40 that is carried on the housing 12. In the illustrated embodiment, the USB port 40 is located below the hook 14.

The apparatus 10 also includes an actuator, generally designated by reference numeral 42 that is concealed within the housing 12 and is adapted or configured to displace the cover 16 between the deployed and retracted positions illustrated in FIGS. 2a and 2b. That actuator 42 is best illustrated in FIGS. 3a, 3b, 4a and 4b.

As illustrated, the actuator 42 includes a compression spring 44 having a first end 46 in engagement with the end wall 20 of the housing 12 and a second end 48 in engagement with the cover 16. The compression spring 44 biases the cover in a first direction toward the hook 14 (note action arrow A).

The actuator 42 also includes a guide track, generally designated by reference numeral 50. In the illustrated embodiment, the guide track 50 is carried on the inner surface of the cylindrical sidewall 18 of the housing 12 behind the base 28 of the hook 14. The guide track 50 includes a recessed guideway 52 and a cam 54 surrounded by the recessed guideway.

The actuator 42 also includes a pin follower 56 carried on the cover 16. As should be appreciated from viewing FIGS. 3a, 3b, 4a and 4b, the pin follower 56 may include a roller 58 carried on the distal end of a support arm 60. As shown, the pin follower 56 engages the guide track 50. More particularly, the roller 58 rides along the cam 54 through the recessed guideway 52.

Figure 3A:
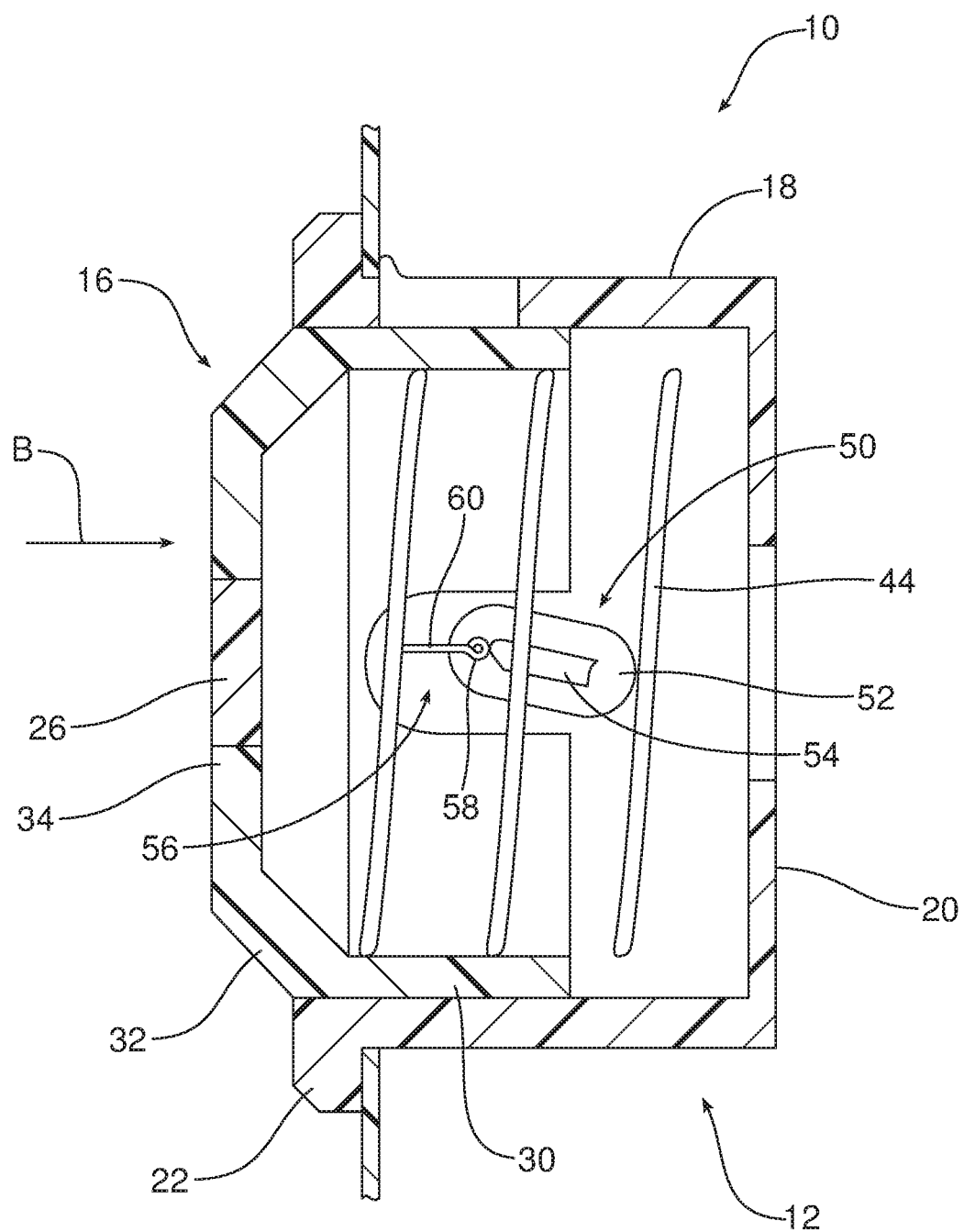
FIG. 3a is a schematic illustration of the actuator for displacing the cover between the deployed and retracted positions that illustrates the cover in the deployed position.
Figure 3B:
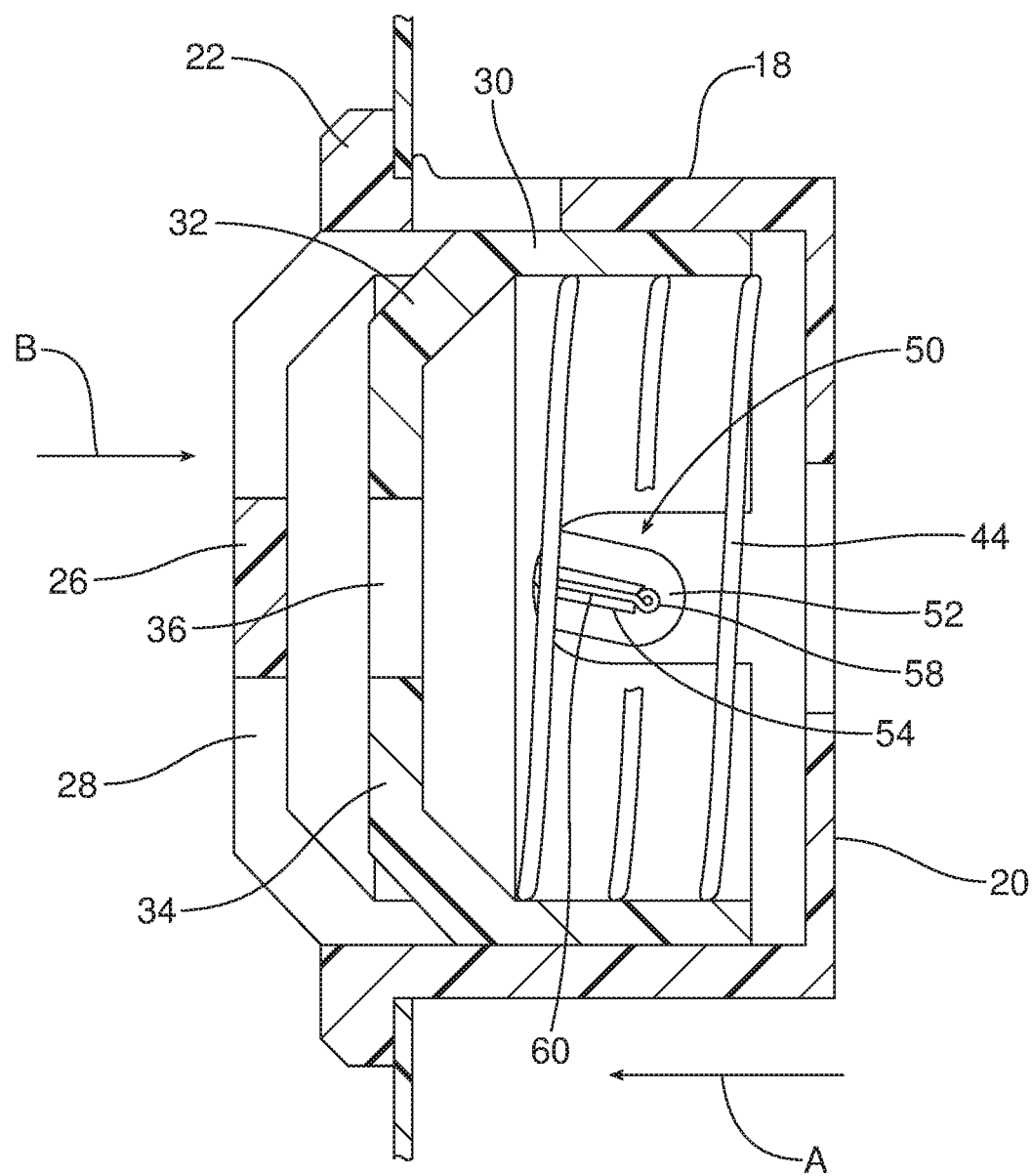
FIG. 3b is a view similar to FIG. 3a but illustrating the cover in the retracted position.
Figure 4A:
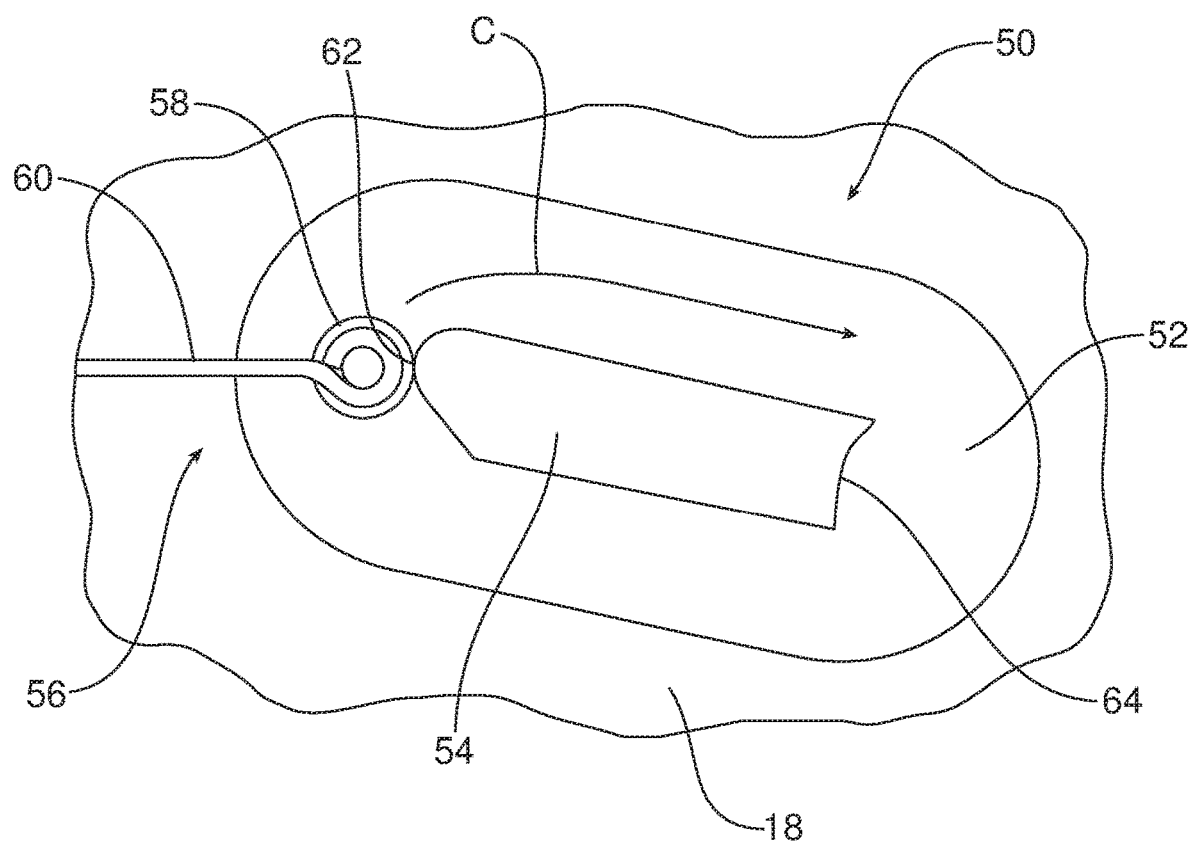
FIG. 4a is a detailed plan view illustrating the pin follower engaging the cam and resting in the recessed guideway when the cover is in the deployed position.
Figure 4B:
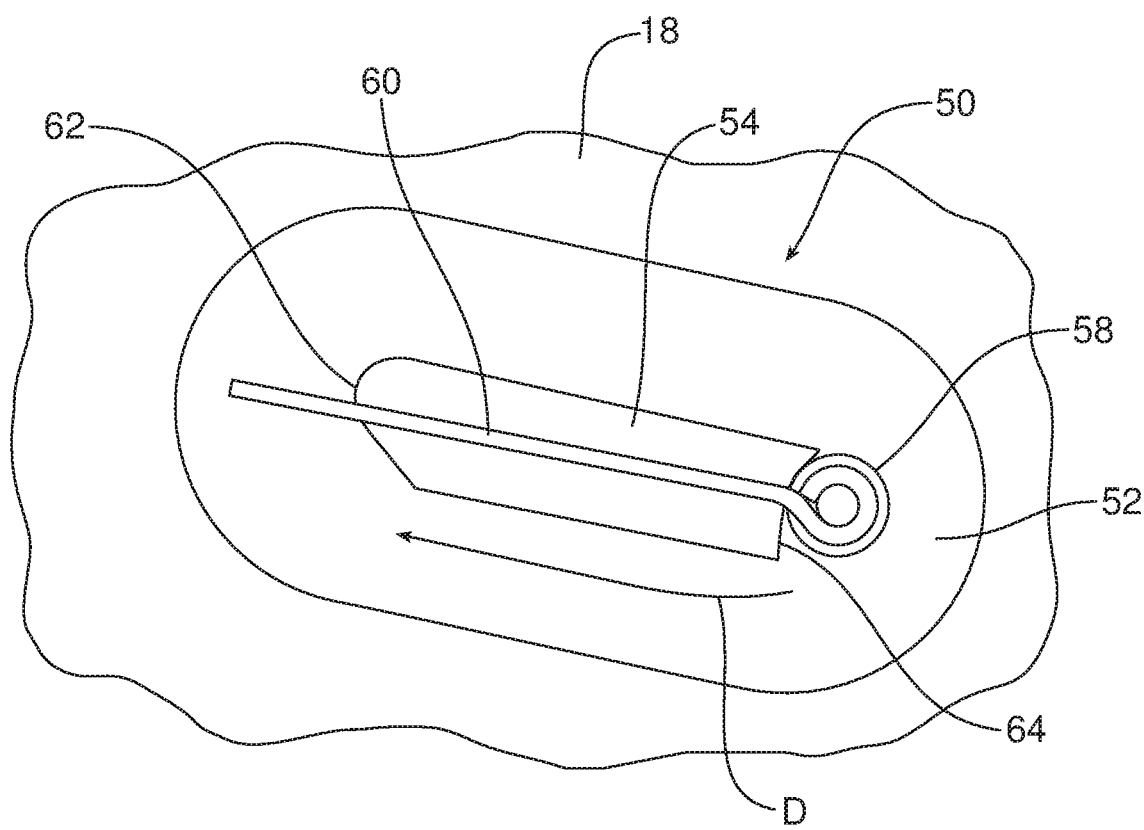
FIG. 4b is a view similar to FIG. 4a but illustrating the pin follower when the cover is in the retracted position.

When the cover 16 is in the deployed position illustrated in FIGS. 2a and 3a, the roller 58 is in engagement with the point 62 of the cam 54 as illustrated in FIG. 4a. When the cover 16 is in the retracted position illustrated in FIGS. 2b and 3b, the roller 58 is engaged in the notch 64 as illustrated in FIG. 4b.

When the cover is in the deployed position illustrated in FIGS. 2a and 3a, one pushes the cover 16 in the direction of action arrow B into the housing 12 to displace the cover into the retracted position. As this is done the roller 58 travels through the guide track 50 along the path illustrated by action arrow C in FIG. 4a until the roller 58 is aligned with the notch 64. When the cover 16 is subsequently released, the roller engages in the notch 64 holding the cover in the retracted position.

When one then wishes to displace the cover 16 from the retracted position to the deployed position, one again pushes the cover in the direction of action arrow B, freeing the roller 58 from the notch 64. Upon release of the cover 16, the cover is biased by the compression spring 44 back to the deployed position. As this occurs, the roller 58 travels along the recessed guideway 52 in the path indicated by action arrow D (see FIG. 4b) until the roller is in engagement with the point 62. The profile of the cam 54, including the notch 64 and the point 62, ensures that the pin follower 56 and, more particularly the roller 58 moves clockwise along the recessed guideway 52 when the cover 16 is depressed or pushed to displace the cover from the deployed position to the retracted position or from the retracted position to the deployed position.

Figure 5C:
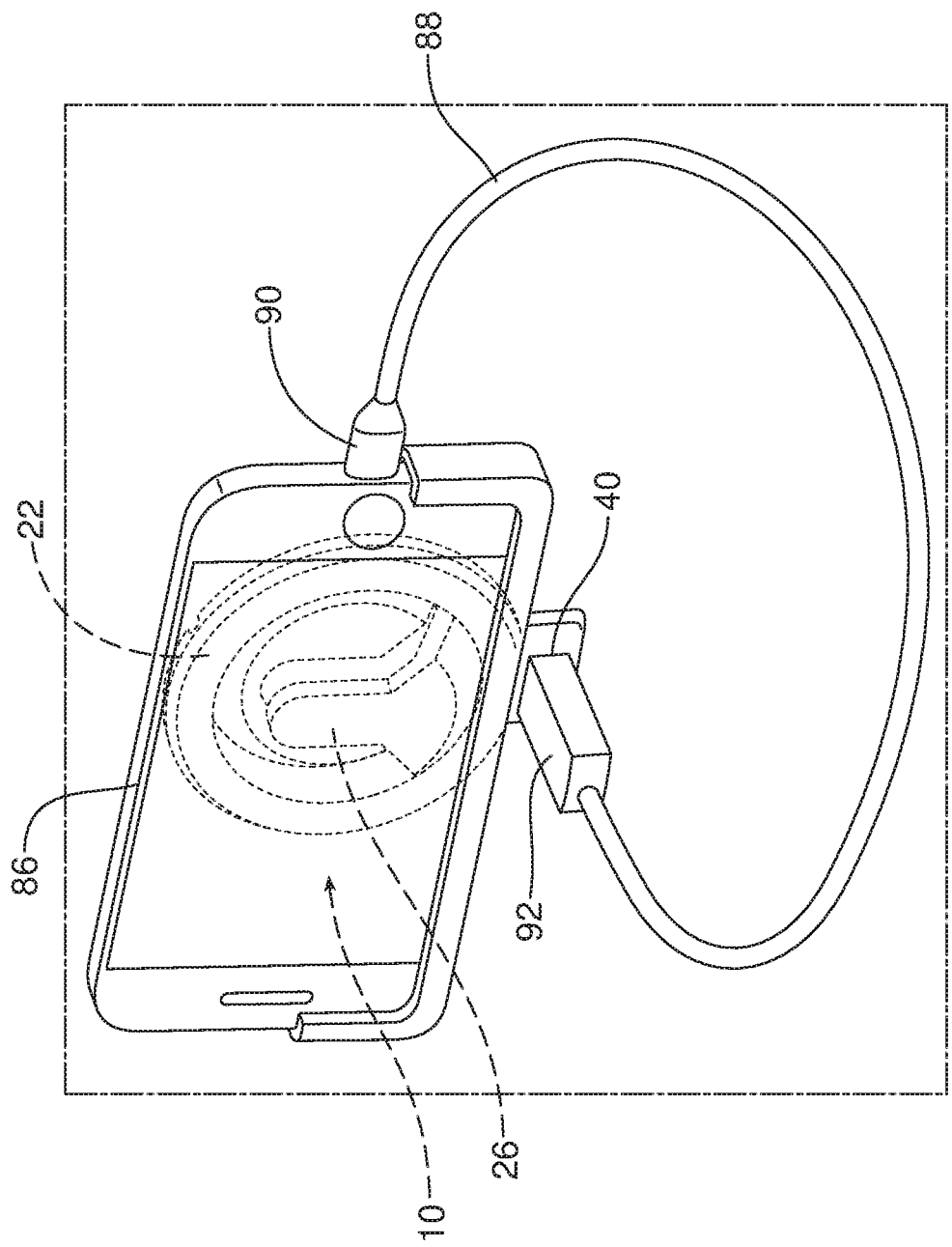

Reference is now made to FIGS. 5a-5c illustrating a mobile device holder 70 adapted for use with the apparatus 10. That mobile device holder 70 includes a body 72 having a front wall 74, a bottom wall 76 and a rear wall 78 defining a device holding pocket or channel 80 of substantially U-shape. Two opposed resilient lugs 82 project from the rear face 84 of the rear wall 78. Those resilient lugs 82 snap around the hook feature 26 of the hook 14 (see FIG. 5b) in order to secure the mobile device holder 70 to the hook. An electronic device such as the smart phone 86 may be inserted into and held in the channel 80. See FIGS. 5a, 5b and 5c. A charge cord 88 may be connected to the smart phone 86 at one end 90 and at the other end 92 connected to the USB port 40 in order to charge the electronic device for use.

Figure 5D:
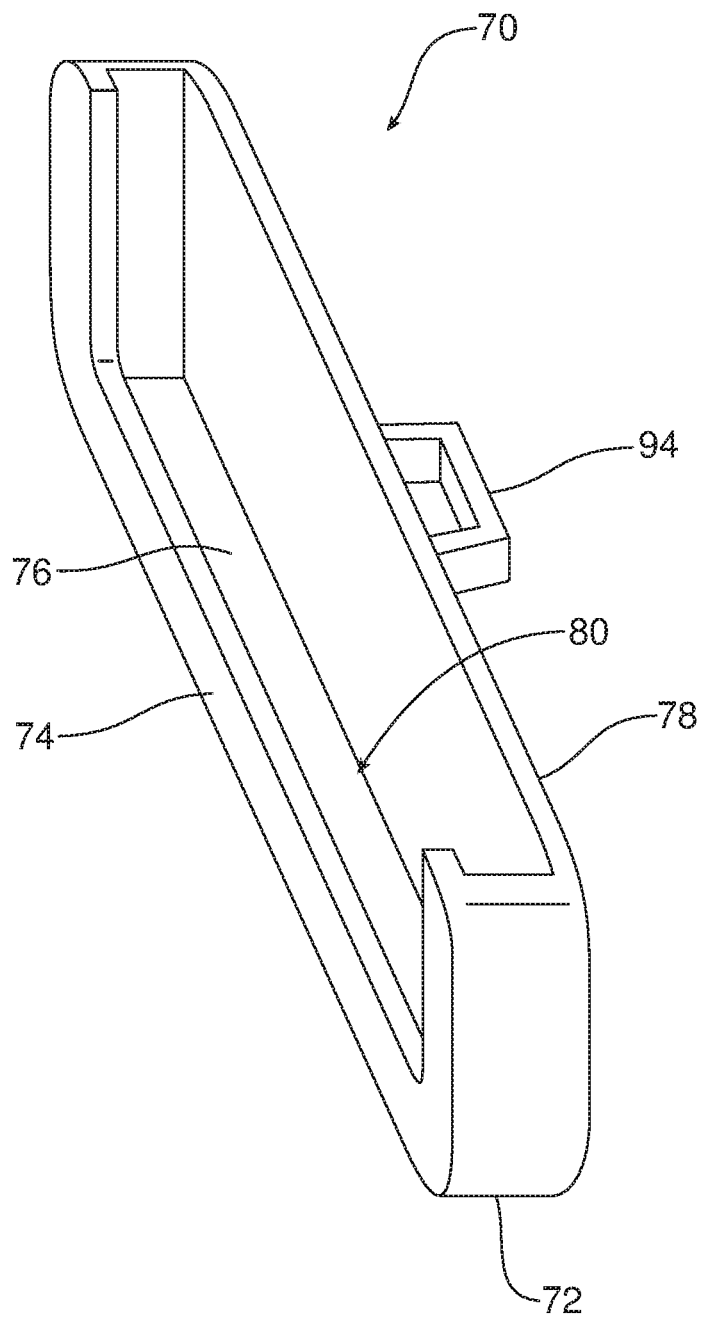

FIG. 5d illustrates an alternative embodiment of the mobile device holder 70 wherein the opposed lugs 82 are replaced by a U-shaped stirrup 94 that will slide down over the hook feature 26 of the hook 14 in order to secure the mobile device holder 70 in a desired position on the apparatus 10.

Figure 6:
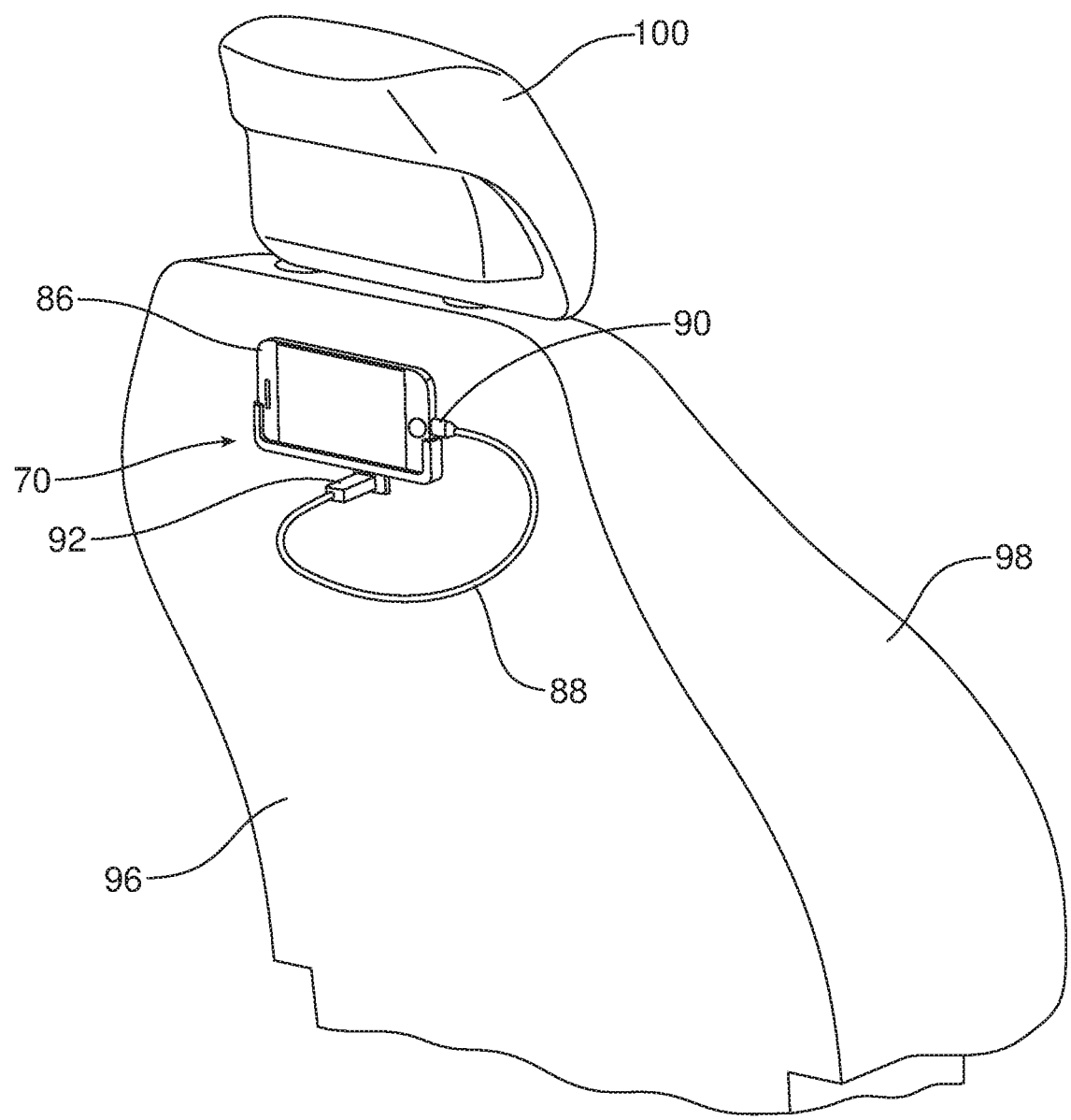
FIG. 6 illustrates an electronic device held in the device holder on the apparatus which is positioned on the rear surface of a motor vehicle seat.

As should be appreciated, the apparatus 10 is small, relatively inexpensive to manufacture and assemble and may be implemented at a number of different locations within a motor vehicle at a relatively low cost. For example, FIG. 6 illustrates a smart phone 86 held in an apparatus 10 provided in the rear face 96 of a motor vehicle seat 98 beneath the headrest 100.

Figure 7:
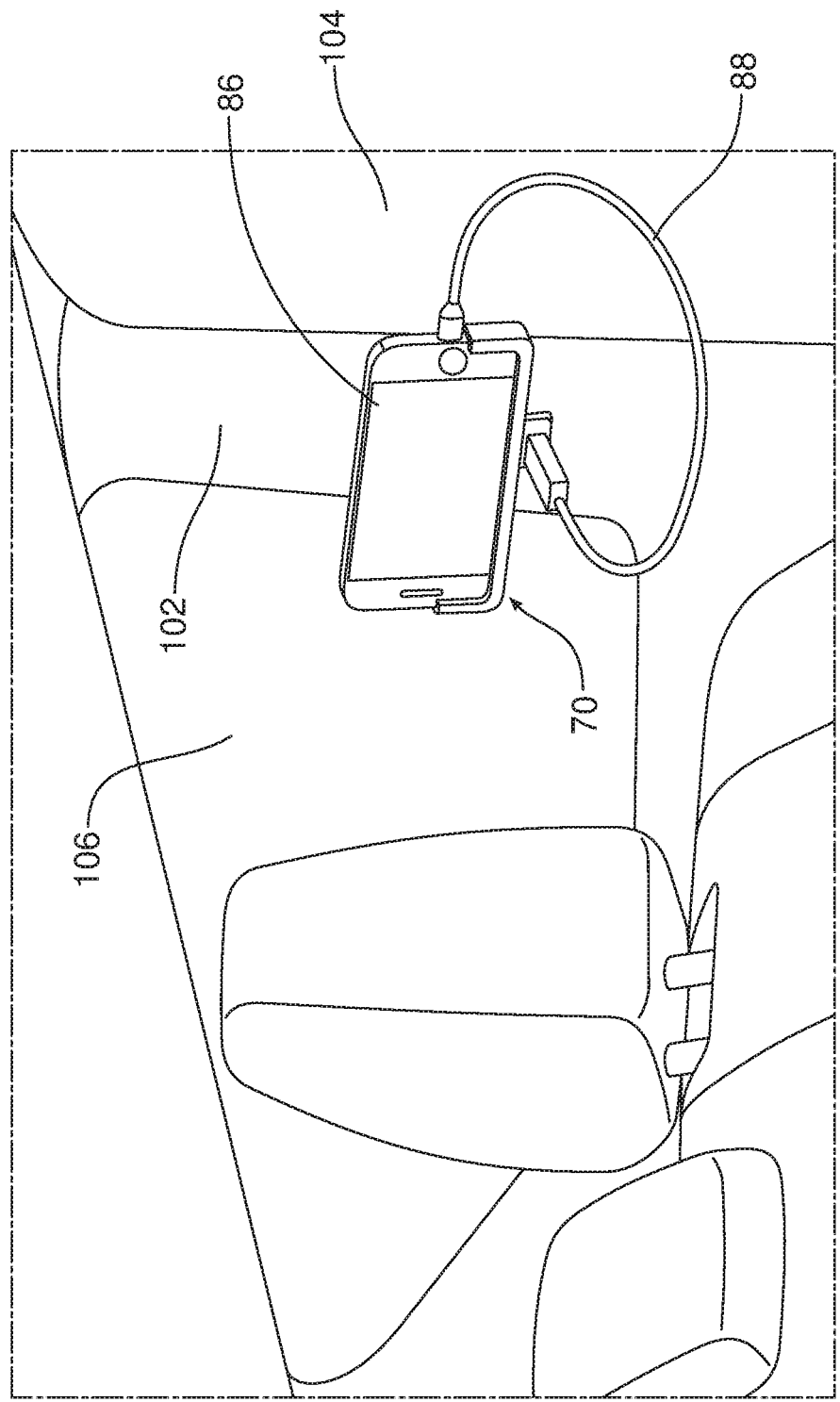
FIG. 7 illustrates an electronic device held in the electronic device holder and secured to the apparatus positioned on a pillar of the motor vehicle.

FIG. 7 illustrates a smart phone 86 held in a mobile device holder 70 on an apparatus 10 provided in a pillar 102 of the motor vehicle between the rear door 104 and the rear quarter window 106.

Figure 8:
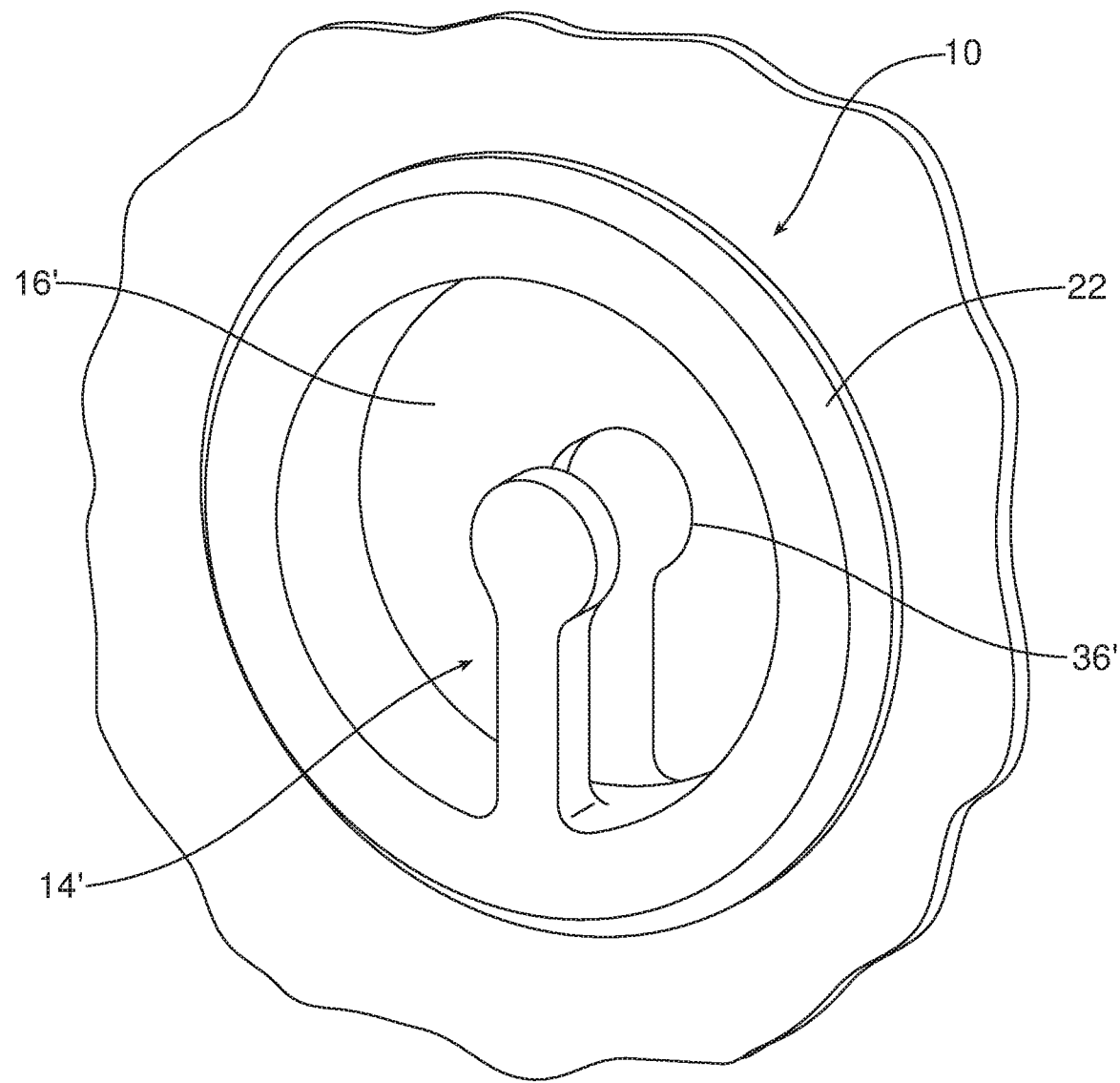
FIG. 8 illustrates an alternative embodiment of the device wherein the hook assumes a different shape than that in the previous illustrations.
Figure 9A:
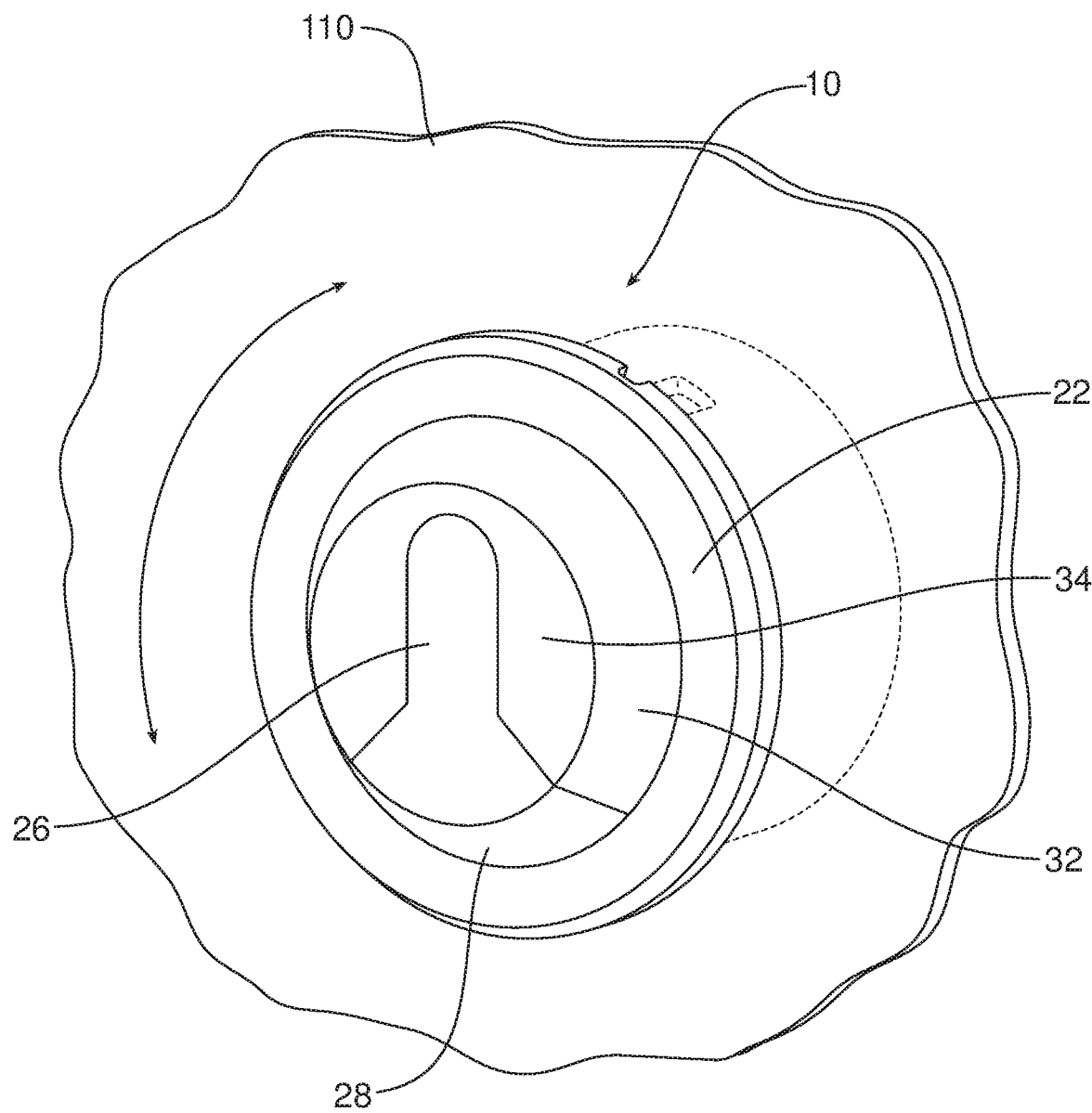
FIGS. 9a and 9b illustrate an alternative embodiment wherein the housing of the apparatus allows for controlled rotation of the hook so that the hook may be oriented in to a number of different positions. More specifically.
Figure 9B:
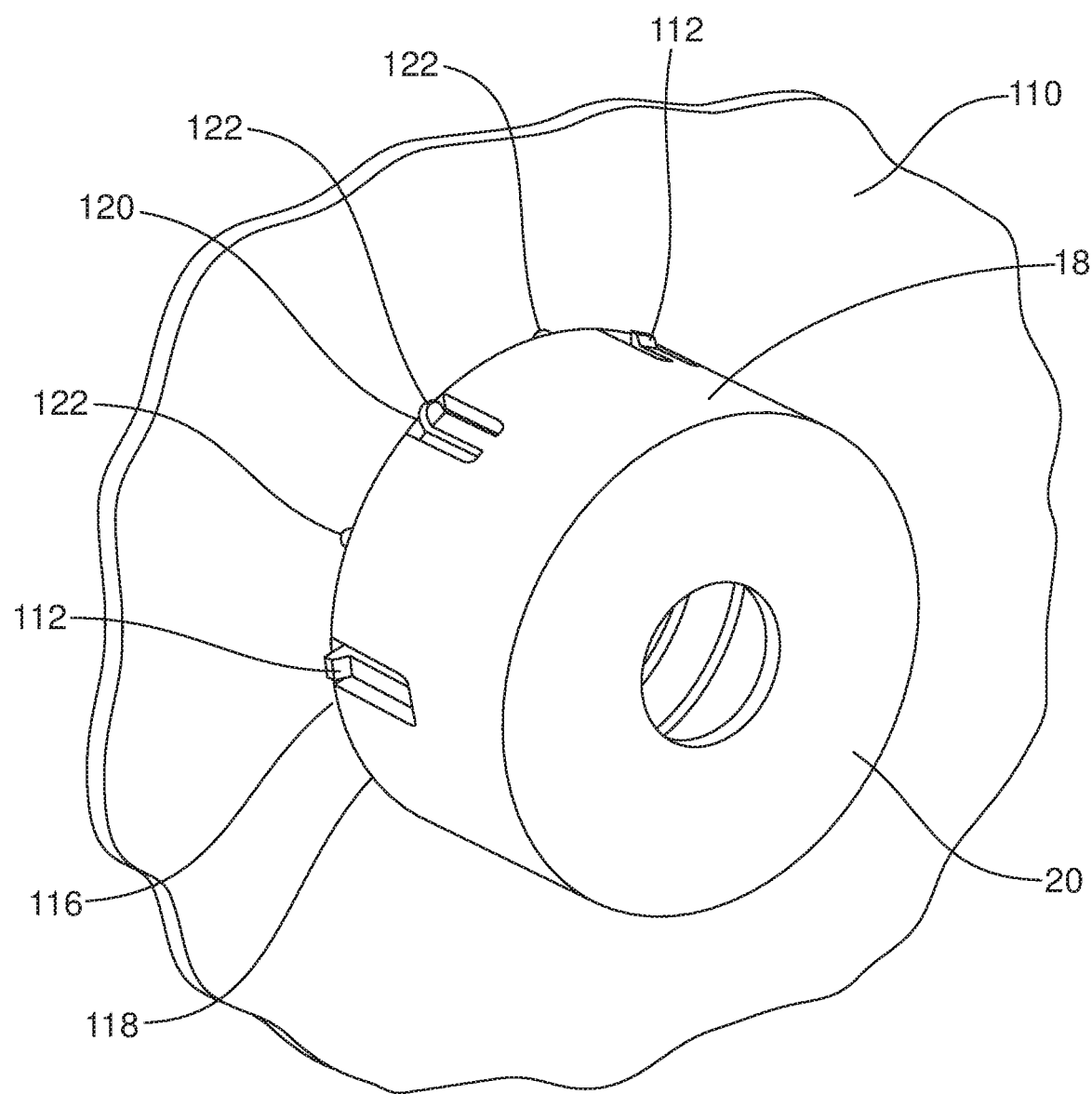
Figure 10:
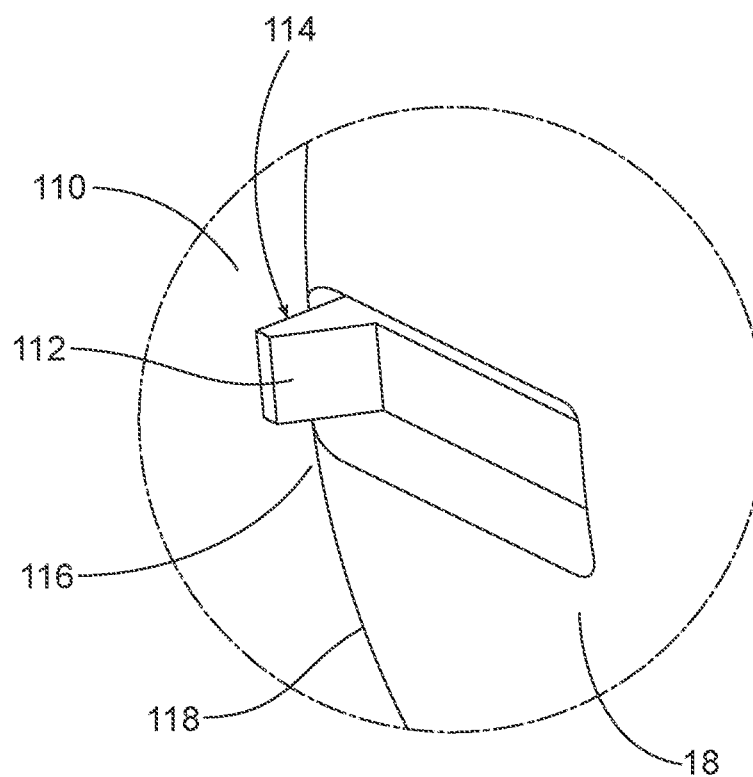
FIG. 10 is a detailed perspective view of a retaining tab on the housing engaging against the B-face of a trim panel.
Figure 11:
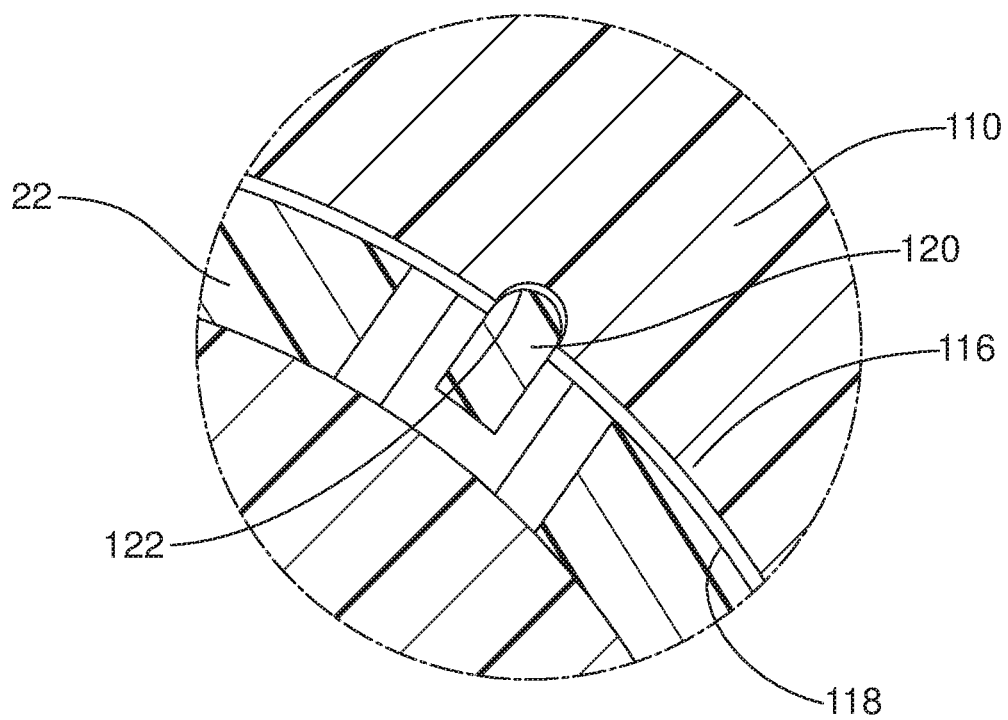
FIG. 11 is a detailed cross-sectional view illustrating an adjustment tab on the housing engaging in one of the adjustment tab receivers provided in the margin of the trim panel that defines the housing receiver.

FIG. 8 illustrates an alternative embodiment of the apparatus 10' wherein the hook 14' has a different profile than the hook 14 illustrated in the embodiment of FIGS. 1, 2a and 2b.

Note the cover 16' includes a hook receiver 36' sized and shaped to match the profile of the hook 14'.

FIGS. 9a, 9b, 10 and 11 illustrate yet another alternative embodiment of the apparatus 10 wherein the housing 12 is adapted to allow the user to orient the hook 14 in various different positions by rotating the hook 14 in a trim panel 110.

As illustrated in FIGS. 9a, 9b, 10 and 11, the housing 12 includes the bezel 22 and at least one resilient retaining tab 112 that define a slot 114 therebetween. The trim panel 110 includes a margin 116 that defines a housing receiver 118. A portion of the margin 116 is captured in the slot 114 between the bezel 22 and the retaining tab 112 when the housing 12 is inserted and properly seated in the housing receiver 118. The at least one retaining tab 112, engaging the B-face of the trim panel 110, effectively prevents the housing 12 from pulling out of the housing receiver 118 in the trim panel.

The housing 12 also includes at least one resilient adjustment tab 120. The margin 116 includes a plurality of adjustment tab receivers 122. The housing 12 may be rotated in the housing receiver 118 in the trim panel 110. Thus one may adjust the angular orientation of the hook 14 by rotating the housing 12, including the hook 14 fixed thereto, in the trim panel 110 and engaging the at least one adjustment tab 120 in different adjustment tab receivers 122 radially arrayed around the housing receiver 118 in the margin 116.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
    a housing;
    a hook fixed to said housing;
    a cover including a hook receiver, said cover being displaceable between a deployed position wherein said hook is received within said hook receiver and a retracted position wherein said cover is retracted into said housing and said hook is exposed from said hook receiver for access; and
    a USB port carried on said housing.
2. The apparatus of claim 1, wherein said cover includes a sidewall and a front wall.
3. The apparatus of claim 2, wherein said hook receiver extends across said front wall and said sidewall.
4. The apparatus of claim 3, wherein said hook has a projecting profile and said hook receiver matches said projecting profile.
5. The apparatus of claim 4, wherein said hook has a front face and said front wall is flush with said front face when said cover is in said deployed position.
6. The apparatus of claim 5, further including an actuator in said housing to displace said cover between said deployed position and said retracted position.
7. The apparatus of claim 6, wherein said actuator includes a spring biasing said cover in a first direction toward said hook.
8. The apparatus of claim 7, wherein said actuator further includes a guide track carried on said housing.
9. The apparatus of claim 8, wherein said actuator further includes a pin follower carried on said cover, said pin follower engaging in said guide track.
10. The apparatus of claim 9, wherein said guide track includes a recessed guideway and a cam that engages said pin follower and guides said pin follower along said recessed guideway.
11. The apparatus of claim 1, further including an actuator in said housing to displace said cover between said deployed position and said retracted position.
12. The apparatus of claim 11, wherein said actuator includes a spring biasing said cover in a first direction toward said hook.
13. The apparatus of claim 12, wherein said actuator further includes a guide track carried on said housing.
14. The apparatus of claim 13, wherein said actuator further includes a pin follower carried on said cover, said pin follower engaging in said guide track.
15. The apparatus of claim 14, wherein said guide track includes a recessed guideway and a cam that engages said pin follower and guides said pin follower along said recessed guideway.
16. The apparatus of claim 1, wherein said housing includes a bezel and at least one retaining tab defining a slot.
17. The apparatus of claim 16, further including a trim panel having a margin defining a housing receiver, a portion of said margin being captured in said slot between said bezel and said at least one retaining tab.
18. The apparatus of claim 17 wherein said housing includes at least one adjustment tab and said margin includes a plurality of adjustment tab receivers whereby angular orientation of said hook is adjusted in said housing receiver.

* * * * *